United States Patent
Yamashina et al.

(10) Patent No.: US 9,461,503 B2
(45) Date of Patent: Oct. 4, 2016

(54) POWER SUPPLY CONTROL DEVICE, IMAGE PROCESSING APPARATUS, AND POWER SUPPLY CONTROL METHOD

(71) Applicant: FUJI XEROX CO., LTD., Tokyo (JP)

(72) Inventors: Susumu Yamashina, Kanagawa (JP); Kazuhiko Narushima, Kanagawa (JP); Masafumi Ono, Kanagawa (JP); Motofumi Baba, Kanagawa (JP); Kenta Ogata, Kanagawa (JP); Kouichi Azuma, Kanagawa (JP); Kenji Kuroishi, Kanagawa (JP); Keiko Shiraishi, Kanagawa (JP); Hidenori Horie, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 995 days.

(21) Appl. No.: 13/676,670

(22) Filed: Nov. 14, 2012

(65) Prior Publication Data
US 2013/0300198 A1    Nov. 14, 2013

(30) Foreign Application Priority Data

May 14, 2012 (JP) ................................. 2012-110754

(51) Int. Cl.
*H02J 9/00* (2006.01)
*G03G 15/00* (2006.01)

(52) U.S. Cl.
CPC ........... *H02J 9/005* (2013.01); *G03G 15/5004* (2013.01); *Y10T 307/469* (2015.04)

(58) Field of Classification Search
CPC G03G 15/5004; H02J 9/005; Y10T 307/469
USPC .......................................................... 307/39
See application file for complete search history.

(56) References Cited

U.S. PATENT DOCUMENTS

2009/0316193 A1* 12/2009 Kohara ............ G03G 15/5016
358/1.15
2010/0150600 A1* 6/2010 Oyoshi .............. G03G 15/5004
399/88
2010/0231390 A1* 9/2010 Hashimoto ........ G03G 15/5004
340/573.1
2013/0156433 A1* 6/2013 Blair .................... H03K 17/941
398/106

FOREIGN PATENT DOCUMENTS

| JP | S58-207148 A | 12/1983 |
| JP | H02-253182 A | 10/1990 |
| JP | H06-242226 A | 9/1994 |
| JP | A-9-166943 | 6/1997 |
| JP | 2004-089631 A | 3/2004 |
| JP | A-2005-17938 | 1/2005 |
| JP | 2008-097064 A | 4/2008 |
| JP | 2009-252199 A | 10/2009 |

OTHER PUBLICATIONS

Dec. 15, 2015 Office Action issued in Japaenese Patent Application No. 2012-110754.

* cited by examiner

*Primary Examiner* — Rexford Barnie
*Assistant Examiner* — Elim Ortiz
(74) *Attorney, Agent, or Firm* — Oliff PLC

(57) ABSTRACT

A power supply control device includes a moving object detecting unit and a power supply unit. The moving object detecting unit is attached to a processing apparatus body including power supply targets and a controller, and is capable of detecting a moving object moving in the vicinity of the processing apparatus body. The moving object detecting unit has a lower detection range for detecting a part of a moving object that is substantially in contact with the floor, and an upper detection range for detecting a top part of a moving object. The power supply unit is included in the controller and is always supplied with power to monitor approach of a moving object with the moving object detecting unit. The power supply unit supplies, upon the moving object detecting unit detecting a moving object, power to a power supply target that includes a part of the controller.

9 Claims, 11 Drawing Sheets

POWER SUPPLY CONTROL DEVICE, IMAGE PROCESSING APPARATUS, AND POWER SUPPLY CONTROL METHOD

CROSS-REFERENCE TO RELATED APPLICATIONS

This application is based on and claims priority under 35 USC 119 from Japanese Patent Application No. 2012-110754 filed May 14, 2012.

BACKGROUND

1. Technical Field

The present invention relates to a power supply control device, an image processing apparatus, and a power supply control method.

2. Summary

According to an aspect of the invention, there is provided a power supply control device including a moving object detecting unit and a power supply unit. The moving object detecting unit is attached to a processing apparatus body and is capable of detecting a moving object moving in the vicinity of the processing apparatus body. The moving object detecting unit has a detection range which is divided into a lower area and an upper area. The lower area is a lower detection range for detecting a part of a moving object that is substantially in contact with the floor. The upper area is an upper detection range for detecting a top part of a moving object. The processing apparatus body includes plural power supply targets and a controller that controls the plural power supply targets. The power supply unit is included in the controller and is always supplied with power so as to monitor approach of a moving object by using the moving object detecting unit. The power supply unit supplies, upon the moving object detecting unit detecting a moving object, power to a power supply target among the plural power supply targets that are included in the processing apparatus body. The power supply target includes a part of the controller other than the power supply unit.

BRIEF DESCRIPTION OF THE DRAWINGS

An exemplary embodiment of the present invention will be described in detail based on the following figures, wherein:

FIG. 6A is an elevational view of detection elements and FIG. 6B is an elevational view of a lens cover, whereas

DETAILED DESCRIPTION

Figure 1:
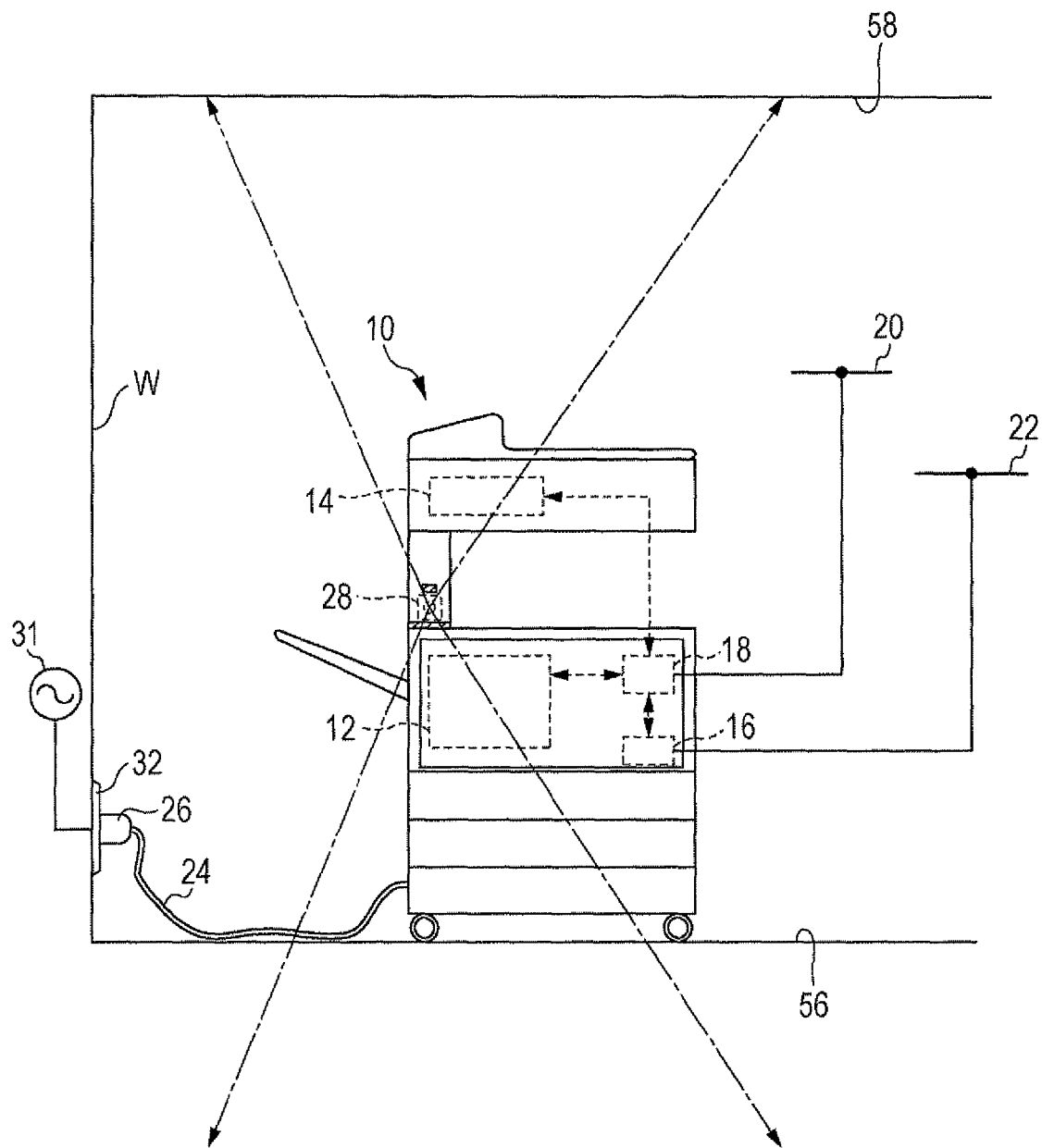
FIG. 1 is a schematic diagram of an image processing apparatus according to an exemplary embodiment.

FIG. 1 illustrates an image processing apparatus 10 according to an exemplary embodiment.

The image processing apparatus 10 includes an image forming section 12 that forms an image on a recording sheet, an image reading section 14 that reads an image from an original document, and a facsimile communication control circuit 16. The image processing apparatus 10 also includes a main controller 18. By using the main controller 18, the image processing apparatus 10 controls the image forming section 12, the image reading section 14, and the facsimile communication control circuit 16, thereby temporarily storing image data of an image read by the image reading section 14 from an original document and sending the read image data to the image forming section 12 or the facsimile communication control circuit 16, for example.

The main controller 18 is connected to a communication network 20, such as the Internet. The facsimile communication control circuit 16 is connected to a telephone network 22. The main controller 18 is connected to, for example, a host computer via the communication network 20, and has a function to receive image data therefrom. The main controller 18 also has a function to receive and send a facsimile via the facsimile communication control circuit 16 by using the telephone network 22.

The image reading section 14 includes a platen on which an original document is positioned, a scanning driving system, and a photoelectric transducer, such as a charge-coupled device (CCD). The scanning driving system scans an image of an original document positioned on the platen by radiating light to the original document. The photoelectric transducer receives light that has been reflected or that has transmitted as a result of scanning performed by the scanning driving system, and converts the received light into electric signals.

The image forming section 12 includes a photoconductor. The image forming section 12 also includes, around the photoconductor, a charging device, a scanning exposure unit, an image developing unit, a transfer unit, and a cleaning unit. The charging device uniformly charges the photoconductor. The scanning exposure unit scans the photoconductor with a light beam based on image data. The image developing unit develops an electrostatic latent image that results from scanning exposure performed by the scanning exposure unit. The transfer unit transfers, onto a recording sheet, the developed image on the photoconductor. The cleaning unit cleans the surface of the photoconductor after transfer. The image forming section 12 further includes, in a path along which recording sheets are conveyed, a fixing unit that fixes the transferred image on the recording sheet.

The image processing apparatus 10 includes an input power line 24, which has an end equipped with a plug 26. The plug 26 is inserted into a receptacle 32, on a wall W, connected to a commercial power supply 31, whereby the image processing apparatus 10 is supplied with power from the commercial power supply 31.

Hardware Configuration of Control System of Image Processing Apparatus

Figure 2:
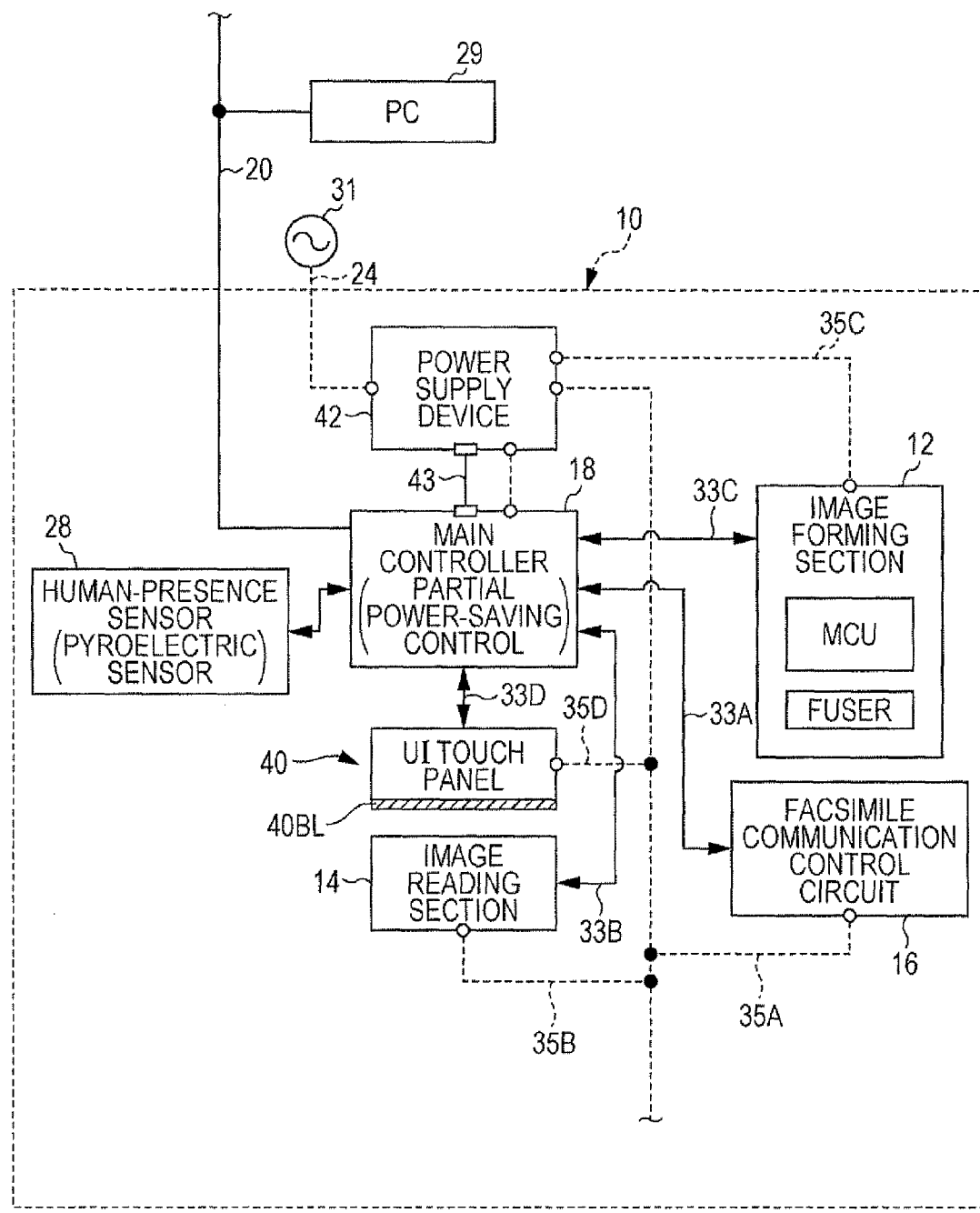
FIG. 2 is a block diagram illustrating the configuration of a control system of the image processing apparatus according to the exemplary embodiment.

FIG. 2 is a schematic diagram of the hardware configuration of a control system of the image processing apparatus 10.

The main controller 18 of the image processing apparatus 10 is connected to the communication network 20, to which a personal computer (terminal device) 29, which possibly serves as a source that sends image data, is connected.

The main controller 18 is connected to the facsimile communication control circuit 16, the image reading section 14, the image forming section 12, and a user interface (UI) touch panel 40 via buses 33A, 33B, 33C, and 33D, respectively, such as data buses and control buses. That is, this main controller 18 controls each processing section of the image processing apparatus 10. The UI touch panel 40 includes a UI-touch-panel backlight unit 40BL.

The image processing apparatus 10 also includes a power supply device 42, which is connected to the main controller 18 through a signal cable harness 43.

The power supply device 42 is supplied with power from the commercial power supply 31 via the input power line 24.

The power supply device 42 is provided with a power supply line, with which power is independently supplied to the main controller 18. The power supply device 42 is also provided with power supply lines 35A, 35B, 35C, and 35D, with which power is independently supplied to the facsimile communication control circuit 16, the image reading section 14, the image forming section 12, and the UI touch panel 40, respectively. This configuration enables the main controller 18 to perform so-called partial power-saving control, in which power is separately supplied to each processing section (device) (in a power-being-supplied mode) or power supplied thereto is separately stopped (in a sleep mode).

The main controller 18 includes therein a power-saving monitoring controller (e.g., an integrated circuit (IC) chip) that is always supplied with power. The power saving monitoring controller is connected to a human-presence sensor 28 so as to monitor whether or not there is a person in the vicinity of the image processing apparatus 10.

Functions of Human-Presence Sensor

If, in the sleep mode, the user stands in front of the image processing apparatus 10 and then operates, for example, a power-saving control button to resume power supply, it may take some time for the image processing apparatus 10 to be fully activated.

Accordingly, the human-presence sensor 28 is provided. Specifically, in the sleep mode, the presence of the user is detected by the human-presence sensor 28 before the user presses the power-saving control button, so that power supply is resumed at an earlier time point. Consequently, the user is able to use the image processing apparatus 10 at an earlier time point. Although both the power-saving control button and the human-presence sensor 28 are used, monitoring may be performed by using the human-presence sensor 28 alone.

The term "human-presence sensor 28" contains the word "human" but this term is merely the proper noun used in this exemplary embodiment. It is sufficient for the human-presence sensor 28 to sense (detect) at least a person. That is, the human-presence sensor 28 may also sense (detect) a moving object other than a person. Although it will be mentioned hereinafter that a target to be detected by the human-presence sensor 28 is a "person", a robot or the like that will perform the operation in place of a person will also be subjected to sensing in the future. On the other hand, if there is a special sensor capable of specifically sensing a person, such a special sensor is usable. Hereinafter, the terms "moving object", "person", "user", and so forth are similarly treated as a target to be detected by the human-presence sensor 28. However, these terms are distinguished between as needed.

Human-Presence Sensor 28

The human-presence sensor 28 according to this exemplary embodiment has the specs to detect movements of a moving object in the vicinity of (e.g., in the range of 0 to 5 meters from) the image processing apparatus 10. The representative type of sensor used in this case is the infrared sensor (pyroelectric sensor) that uses the pyroelectric effect of pyroelectric elements. In this exemplary embodiment, the pyroelectric sensor is used as the human-presence sensor 28. For example, a binary signal, which is the output signal, is inverted if a change in temperature within a detection range exceeds a predetermined threshold.

The remarkable feature of the sensor that uses the pyroelectric effect of pyroelectric elements, which is used as the human-presence sensor 28, is that the sensor has a wide detection area. The sensor detects movements of a moving object. Thus, when a person is stationary within the detection area, the sensor fails to detect the presence of the person because no temperature change occurs. For example, the sensor outputs a high-level signal while a person is moving. If the person within the detection range stops moving to be stationary, the signal changes to a low-level signal.

The state "being stationary" obviously includes a completely stationary state such as in still images captured with a still camera or the like. In this exemplary embodiment, it is assumed that the state "being stationary" also includes a state in which a person is standing in front of the image processing apparatus 10 to perform an operation. Thus, a slight movement of a predetermined range (such as a movement caused by breathing) and a movement of hands, feet, or the neck are also in the category "being stationary".

The human-presence sensor 28 possibly detects the presence of a person if the person does stretching exercises in front of the image processing apparatus 10 while the person is waiting for completion of a process of image forming or image reading, for example. Conversely, if a person enters the room from the outside, where the temperature is lower than that of the room, cloths having a low temperature possibly prevents the human-presence sensor 28 from detecting the temperature of the person. This case will be described later.

For the above reasons, instead of defining the state "being stationary" and of setting a threshold used by the human-presence sensor 28 to detect movements, a comparatively rough threshold may be set according to the standard so as to depend on the environment-based (such as temperature-and-humidity-based) detection state of the human-presence sensor 28. Specifically, the threshold may be set on the basis of experiments or statistics for a place where the image processing apparatus 10 is placed, so that it is indicated that a person is moving when the human-presence sensor 28 outputs one value (e.g., high-level signal) of the binary signal and that a person is stationary when the person is located within the detection area of the human-presence sensor 28 and the human-presence sensor 28 outputs the other value (e.g., low-level signal) of the binary signal.

The human-presence sensor 28 is not limited to the pyroelectric sensor as long as the sensor is able to achieve individual functions of the human-presence sensor 28 described below.

In this exemplary embodiment, upon a moving object (user) entering the detection area covered by the human-presence sensor 28, an instruction to shift from the sleep mode into the standby mode is issued.

On the other hand, when power supply is stopped, both a timer function and the moving object detection result obtained by the human-presence sensor 28 are used.

Configuration of Human-Presence Sensor 28 and Peripherals Thereof

Figure 3:
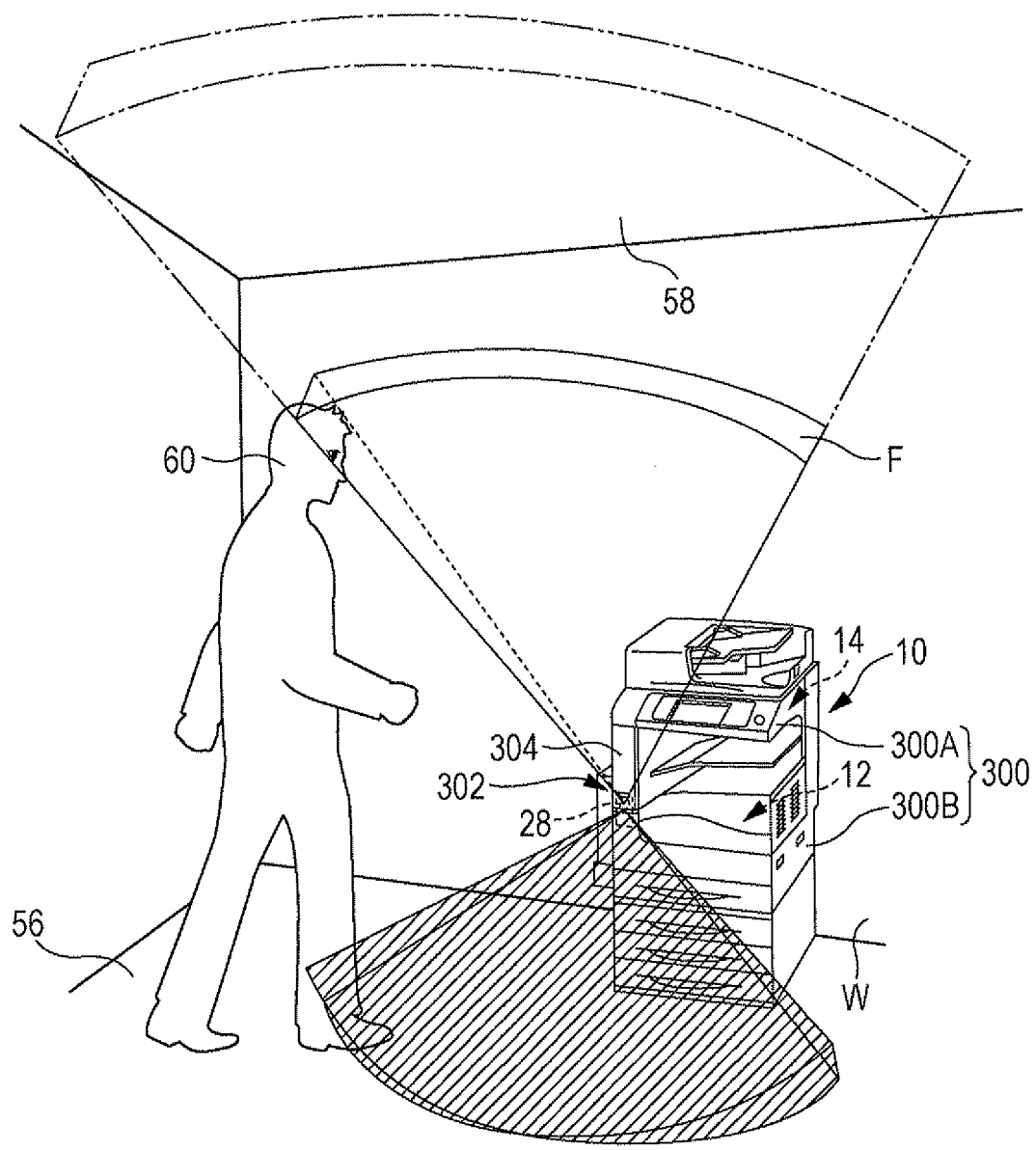
FIG. 3 is a perspective view illustrating the image processing apparatus according to the exemplary embodiment and surroundings thereof.

As illustrated in FIG. 3, the image processing apparatus 10 includes a casing 300, which covers the image reading section 14, the image forming section 12, etc. The casing 300 has a pillar part 302, which has a vertically elongated rectangular shape and to which the human-presence sensor 28 is attached. The pillar part 302 is a part that couples an upper casing 300A that covers the image reading section 14 to a lower casing 300B that covers the image forming section 12. The pillar part 302 includes a recording medium conveying system therein.

Figure 4:
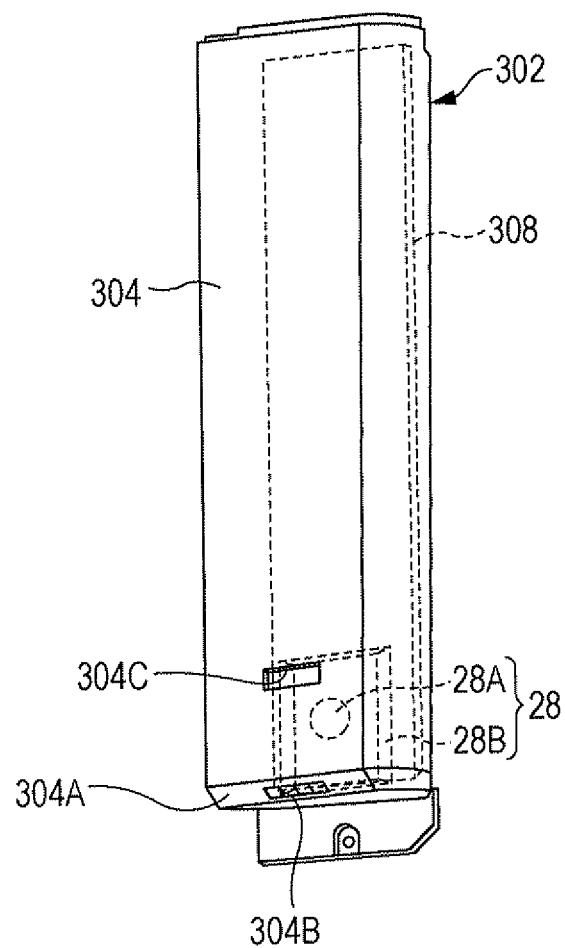
FIG. 4 is a perspective view of a covering member attached to the front surface of a pillar part according to the exemplary embodiment.

To the front surface of the pillar part 302, a covering member 304 is attached which has a vertically elongated rectangular shape and covers the pillar part 302 from a design point of view. As illustrated in FIG. 4, a structure 308 (see FIG. 5), to which the human-presence sensor 28 is attached, is provided on the back-surface side of the covering member 304.

Figure 5:
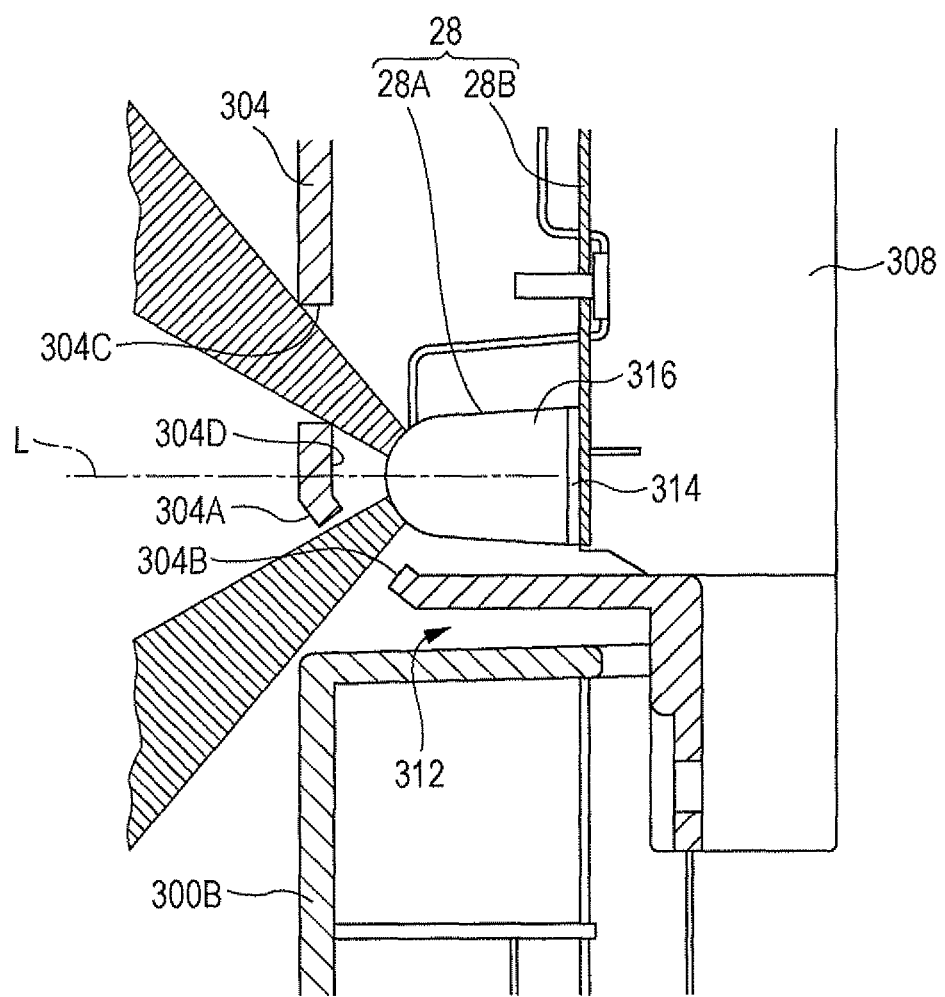
FIG. 5 is a side sectional view of the pillar part to which a human-presence sensor is attached.

As illustrated in FIG. 5, there is a gap 312 between the lower surface of the covering member 304 and the upper surface of the lower casing 300B. The lower end part of the covering member 304 illustrated in FIG. 5 has a so-called chamfered shape (chamfered part 304A), so that the opening space of the gap 312 is larger than that further inward in the depth direction.

The chamfered part 304A has a rectangular through hole 304B. Since the through hole 304B is formed in the chamfered part 304A, the through hole 304B is less likely to be visible from in front of the image processing apparatus 10 than if the though hole 304B were formed in the front surface of the covering member 304. Thus, the through hole 304B does not spoil the design of the covering member 304.

The human-presence sensor 28, which includes a detection unit 28A, is attached to the structure 308 such that the central optical axis (normal L) of the detection plane (to be described in detail later) of the detection unit 28A is substantially horizontal. Since the through hole 304B is formed below this normal L, the through hole 304B has a function of a lower monitoring window through which the human-presence sensor 28 detects a moving object.

The covering member 304 also has a through hole 304C above the normal L. This through hole 304C has a function of an upper monitoring window through which the human-presence sensor 28 detects a moving object. Hereinafter, the through holes 304B and 304C are collectively referred to as monitoring windows 304 occasionally.

The human-presence sensor 28 includes the detection unit 28A and a circuit board unit 28B. The circuit board unit 28B is attached to the structure 308, which is arranged substantially in parallel to the covering member 304. As a result, the central optical axis (normal L) of the detection plane of the detection unit 28A is set to be substantially horizontal. The detection unit 28A, which faces the front side (back surface) of the covering member 304, is concealed.

Figure 6A:
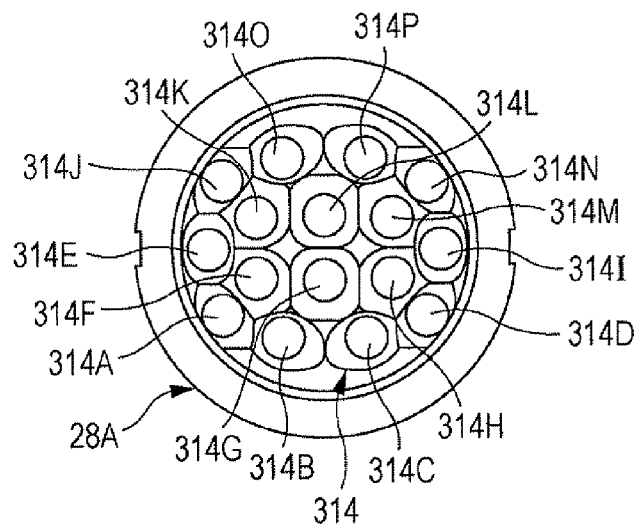
FIGS. 6A and 6B are elevational views of a sensor unit of the human-presence sensor according to the exemplary embodiment, specifically.

FIG. 6A is an elevational view of the detection plane of the detection unit 28A of the human-presence sensor 28 (pyroelectric sensor) used in this exemplary embodiment. The detection unit 28A includes a set of multiple detection elements (in this exemplary embodiments, a set of 16 detection elements 314A, 314B, 314C, 314D, 314E, 314F, 314G, 314H, 314I, 314J, 314K, 314L, 314M, 314N, 314O, and 314P). Hereinafter, those detection elements 314A to 314P are collectively referred to as detection elements 314 occasionally.

The detection elements 314 each are capable of detecting infrared radiation. Electric signals, which correspond to changes in infrared radiation input to the individual detection elements 314, are combined by the circuit board unit 28B (see FIG. 5), and are output as a single electric signal of the sensor.

The detection unit 28A is covered with a lens cover 316 (see FIG. 5) that has a bullet shape (a tubular shape having a hemisphere-shaped end). The hemisphere-shaped end of the lens cover 316 has partitioned lens portions 318A to 318P (see FIG. 6B and hereinafter which are collectively referred to as "lens potions 318" occasionally), the number of which is based on the number of the detection elements 314 (herein 16). Individual areas where light is condensed by the respective lens portions 318 are detection areas of the corresponding detection elements 314. The detection areas have at least an area (detection area determined by the specs) in common. The more effectively the detection elements 314 are utilized, the higher the intensity (accuracy) of the output electric signal becomes.

Figure 6B:
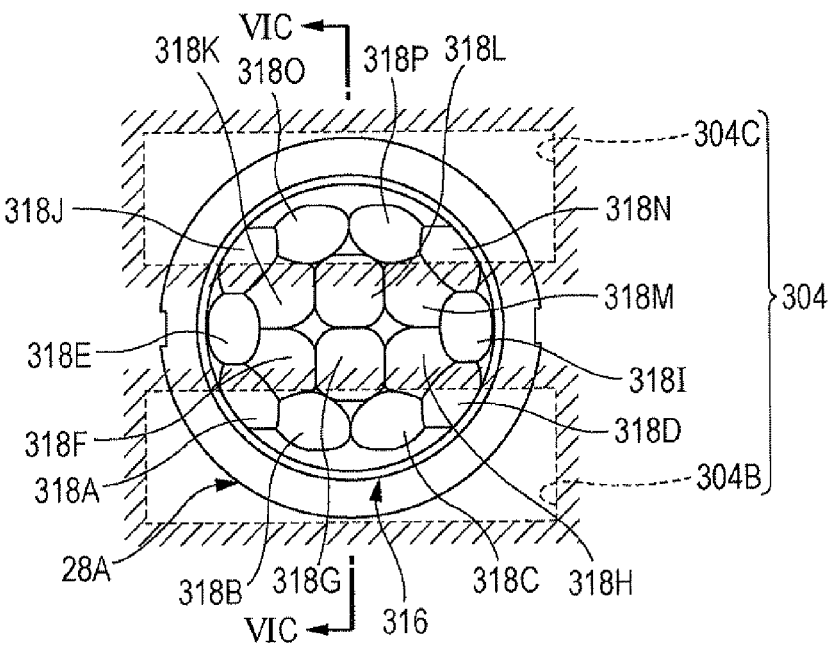
Figure 6C:
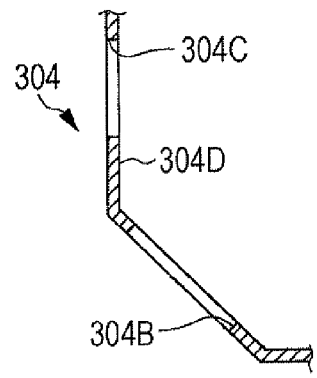
FIG. 6C is a sectional view taken along the line VTC-VTC.

As illustrated in FIGS. 5, 6B, and 6C, the front surface of the human-presence sensor 28 is concealed by the back side 304D of the front surface of the covering member 304. Thus, some of the detection elements 314 (in FIG. 6B, approximately one-third of the detection elements 314 located in each of the upper part and the lower part) serve as effective detection elements capable of detecting infrared radiation through the monitoring windows 304. Specifically, the one-third of the detection elements in the lower part are the detection elements 314A, 314B, 314C, and 314D, whereas the one-third of the detection elements in the upper part are the detection elements 314J, 314N, 314O, and 314P.

In other words, the rest of the detection elements 314E, 314F, 314G, 314H, 314I, 314K, 314L, and 314M are disabled detection elements incapable of detecting infrared radiation.

In terms of the detection accuracy, it is obviously preferable to use the intensity (e.g., voltage value) of a combined signal of signals of all the (16) detection elements 314A to 314P. However, it has been proved that even the intensity of the signal for one detection element is sufficient enough to detect a moving object though the detection accuracy decreases compared to the case of using the intensity of the signal for two or more detection elements.

Figure 7:
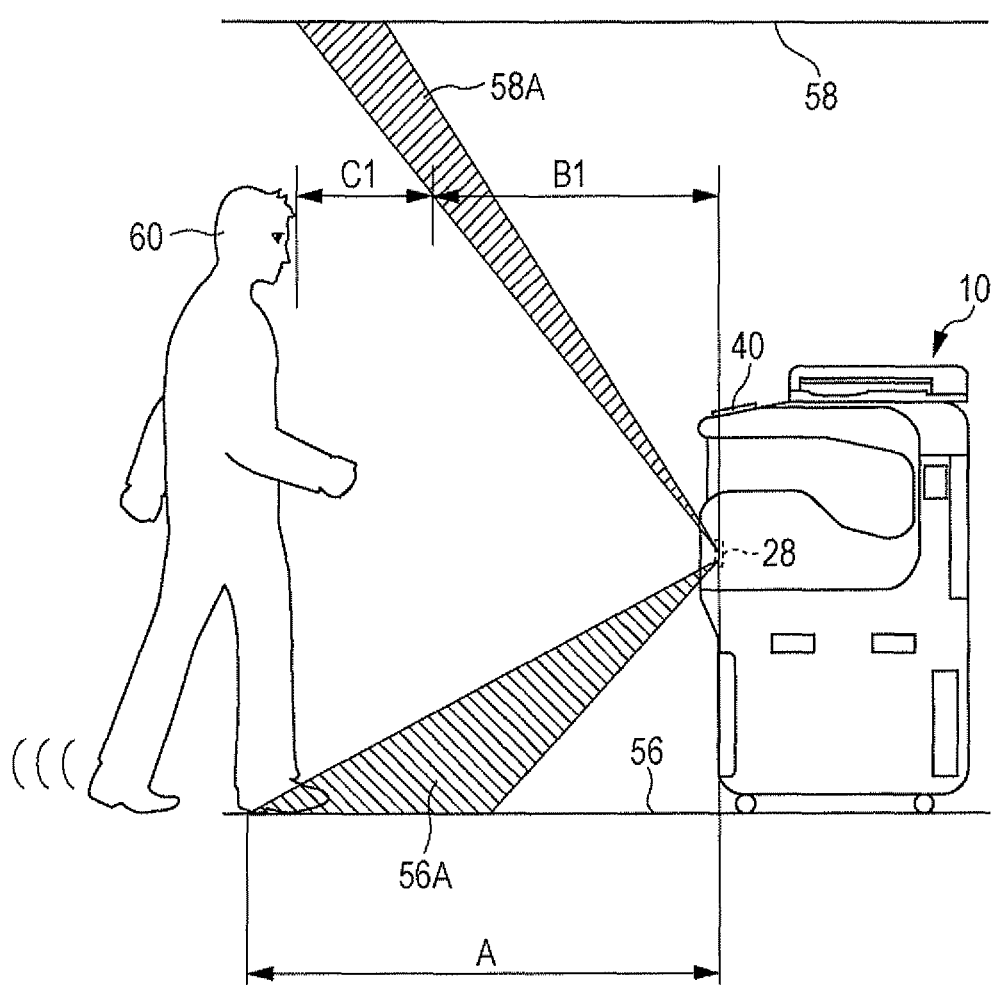
FIG. 7 is a side view (part one) illustrating the image processing apparatus and surroundings thereof, and illustrating an upper area and a lower area of the human-presence sensor in accordance with the exemplary embodiment.
Figure 8:
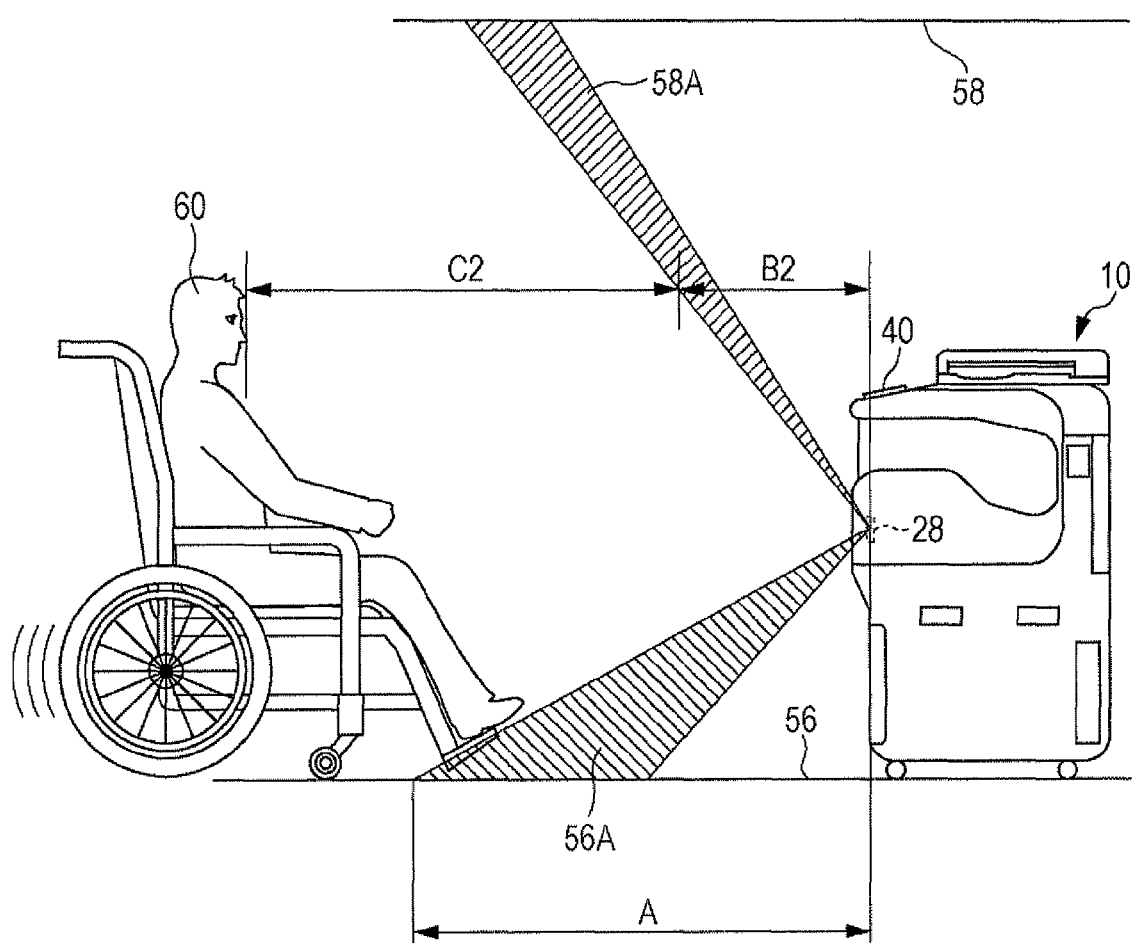
FIG. 8 is a side view (part two) illustrating the image processing apparatus and surroundings thereof, and illustrating an upper area and a lower area of the human-presence sensor in accordance with the exemplary embodiment.

As illustrated in FIGS. 7 and 8, the detection areas (detection ranges) of the human-presence sensor 28 are set to be a lower area 56A and an upper area 58A, which are two separate areas extending toward a floor surface 56 on which the image processing apparatus 10 is placed and toward a ceiling surface 58, respectively.

Specifically, the detection range of the lower area 56A reaches the floor surface 56. Accordingly, the lower area 56A covers a part (feet part) of the moving object (user 60), who is moving towards the image processing apparatus 10, that is substantially in contact with the floor.

Figure 9:
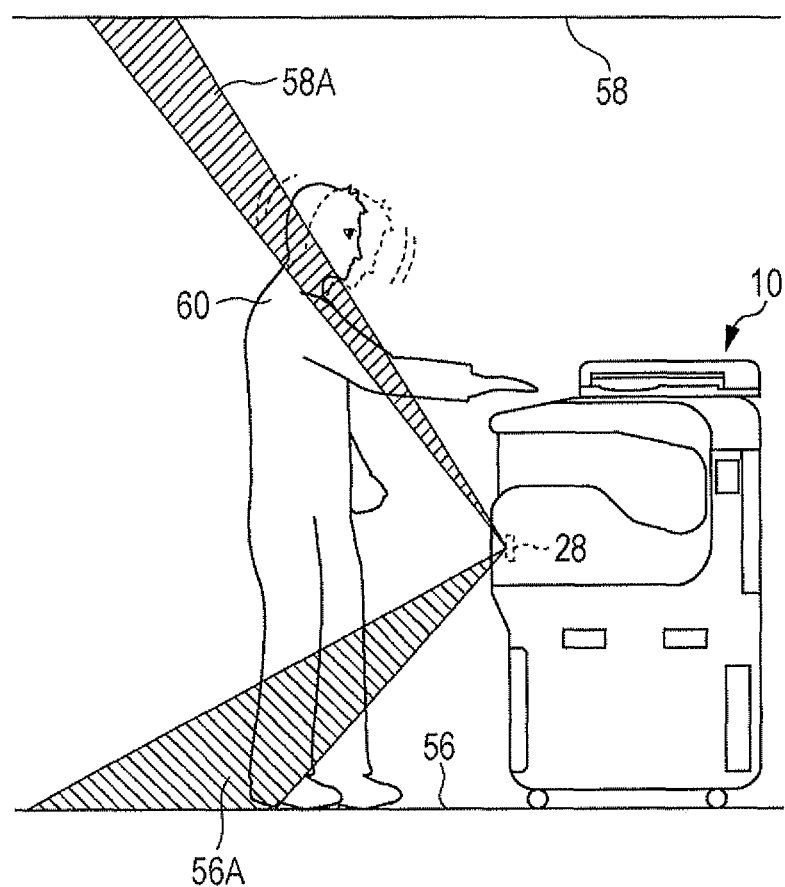
FIG. 9 is a side view (part one) illustrating a state in which the user illustrated in FIG. 7 is facing the image processing apparatus.
Figure 10:
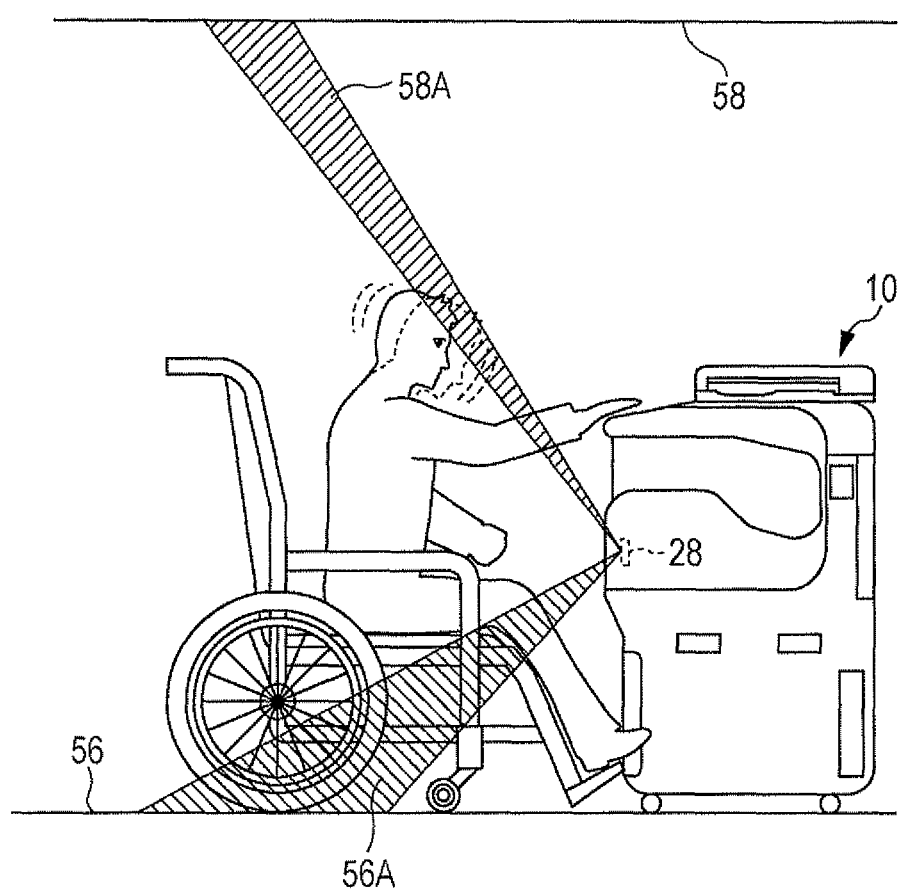
FIG. 10 is a side view (part two) illustrating a state in which the user illustrated in FIG. 8 is facing the image processing apparatus.

The human-presence sensor 28 detects a temperature change within the detection range. Thus, the moving object (user 60) has to be moving in order for the human-presence sensor 28 to detect the moving object (user 60). However, regarding the feet part (for example, in the case where the user 60 is in front of the image processing apparatus 10 and is operating the UI touch panel 40 or the like as illustrated in FIGS. 9 and 10), the human-presence sensor 28 possibly fails to detect a temperature change.

Accordingly, in this exemplary embodiment, in addition to the lower area 56A, the upper area 58A is also set as the detection range of the human-presence sensor 28. This upper area 58A, which ultimately reaches the ceiling surface 58, is set based on an assumption that the top part (head part) of the moving object (user 60), which is expected to most frequently move, enters the space up to the ceiling surface 58 (see FIGS. 9 and 10).

As illustrated in FIGS. 7 and 8, a maximum distance A from the image processing apparatus 10 in the case where the feet part of the user 60 is detected with the lower area 56A is set to be longer than maximum distances B1 (see FIGS. 7) and B2 (see FIG. 8) from the image processing apparatus 10 in the case where the head part of the user 60 is detected with the upper area 58A. In this way, a detection time lag due to the difference in the maximum height of the user 60 (for example, the difference between the distance C1 of FIG. 7 and the distance C2 of FIG. 8, where C1<C2) is to be addressed.

The operation in this exemplary embodiment will be described below.

Example of Mode Change in Power Supply Control of Image Processing Apparatus 10 (Device)

When the image processing apparatus 10 does not perform any process, the operation state changes to the sleep mode.

If there is an activation trigger (detection of an activation trigger, such as detection of the user by the human-presence sensor 28, or an operation of a power-saving control button or the like) in this state, the operation state changes to a warm-up mode.

A mode may be provided in which the amount of power supply increases compared to that in the original sleep mode because of activation of the main controller 18 and the UI touch panel 40. This mode may be defined as the sleep mode or another mode.

If, for example, the power-saving control button is operated after an activation trigger, the operation mode returns to a mode of selecting a job. Depending on the selected job, a device to be activated is determined. If it is determined that the image forming section 12 is not to be activated, warm-up is omitted.

Examples of the activation trigger include authentication for operating an IC card reader as well as detection of the user by the human-presence sensor 28 and the user's power-saving cancelling operation by operating the power-saving control button.

The warm-up mode is a mode in which the image processing apparatus 10 warms up so that the image processing apparatus 10 (mainly, the temperature of the fixing unit of the image forming section 12) rapidly shifts into a ready-to-process state. Thus, the warm-up mode has the largest power consumption among all modes. However, the use of an induction heater as the heater of the fixing unit shortens a period of the warm-up mode compared to the case of using a halogen lamp heater. Alternatively, both the induction heater and the halogen lamp heater may be used. The warm-up mode is a mode with the largest power consumption (e.g., 1200 W).

After finishing warming up in the warm-up mode, the image processing apparatus 10 enters the standby mode.

The standby mode is literally a mode in which "preparation has completed for a process", and thus the image processing apparatus 10 is ready to perform an image processing operation any time.

Accordingly, if a job execution operation is input using a button, the operation state of the image processing apparatus 10 changes to a run mode, in which image processing based on the job instruction is to be performed.

After the image processing ends (all jobs end when there are multiple consecutive jobs in a queue), the operation state of the image processing apparatus 10 changes to the standby mode in response to a standby trigger. Specifically, a timer provided by the timer function is started after the image processing ends. After a predetermined period has passed, the standby trigger is output, in response to which the operation state may change to the standby mode.

If a job execution instruction is issued in the standby mode, the operation state changes to the run mode again. When an inactivation trigger is detected or when a predetermined period has passed, the operation state changes to the sleep mode. Examples of the inactivation trigger include a signal based on the detection result obtained by the human-presence sensor 28, the timer function, and the combination thereof.

The mode change in the actual operation of the image processing apparatus 10 does not necessarily occur according to the sequence as indicated by a single timing chart. For example, there may be a case where the process is aborted in the standby mode after the warm-up mode, and the operation state then changes into the sleep mode.

As described above, the image processing apparatus 10 according to this exemplary embodiment is switched between the modes. Power to be consumed differs in each mode.

Also, in this exemplary embodiment, power supply control is performed on a device-by-device basis. This enables so-called partial power saving such that, for example, when an instruction for an image reading process is issued in the sleep mode, power is supplied to the image reading section 14 with the image forming section 12 kept inactive.

Monitoring by Human-Presence Sensor 28 in Sleep Mode

In this exemplary embodiment, generally the human-presence sensor 28 alone is supplied with power in the sleep mode and is monitoring approach of a moving object.

Upon detecting a moving object (user 60) (a state in which the moving object has just entered the detection area as illustrated in FIGS. 7 and 8), the human-presence sensor 28 recognizes the moving object as the user who is to use the image processing apparatus 10 and power is supplied to the part (e.g., the main controller 18 and the UI touch panel 40) or entirety of the image processing apparatus 10.

In this exemplary embodiment, the detection area of the human-presence sensor 28 is divided into the lower area 56A and the upper area 58A as illustrated in FIGS. 7 and 8.

In order to detect an approaching moving object (person), the floor surface 56 side, i.e., the lower area 56A, where the feet part is detectable for sure, is typically set as the detection range. However, because the human-presence sensor 28 detects a temperature change within the detection range, the human-presence sensor 28 possibly fails to detect the temperature change if the moving object stops moving and consequently no temperature change occurs.

Accordingly, in this exemplary embodiment, the upper area 58A is set as the detection range of the human-presence sensor 28 in addition to the lower area 56A, thereby setting, as the detection target, the head part of the moving object (person if the moving object is the user) in addition to the feet part.

As described above, in this exemplary embodiment, the detection range of the human-presence sensor 28 is divided into the detection range of the lower area 56A extending toward the floor surface 56 and the detection range of the upper area 58A extending toward the ceiling surface 58. For example, suppose that the moving object (user 60) stops moving their feet when operating the UI touch panel 40 of the image processing apparatus 10 in front of the image processing apparatus 10 (see FIGS. 9 and 10). The head part becomes completely stationary less frequently than the feet part (see FIGS. 9 and 10). Thus, the user 60 who is operating the UI touch panel 40 or the like is recognizable.

In this exemplary embodiment, the detection range of the human-presence sensor 28 is divided into the lower area 56A and the upper area 58A, for which different detection distances are set. Specifically, the maximum distance A from the image processing apparatus 10 in the case where the feet part of the user 60 is detected with the lower area 56A is longer than the maximum distance B1 or B2 from the image processing apparatus 10 in the case where the head part of the user 60 is detected with the upper area 58A. That is, the detection position for the feet part is farther than the detection position for the head part.

With this configuration, a detection time lag due to the difference in the maximum height of the user 60 (for example, the difference between the distance C1 of FIG. 7 and the distance C2 of FIG. 8, where C1<C2) is to be addressed.

Modifications

In this exemplary embodiment, among the detection elements 314 of the human-presence sensor 28, the detection elements 314A, 314B, 314C, and 314D perform detection in the lower area 56A and the detection elements 314J, 314N, 314O, and 314P perform detection in the upper area 58A.

In this case, the signal intensity for the detection elements 314A, 314B, 314C, and 314D possibly differs from the signal intensity for the detection elements 314J, 314N, 314O, and 314P because of individual differences of these detection elements. Consequently, the detection reference (detection threshold) for the upper area 58A possibly differs from that for the lower area 56A.

Figure 11:
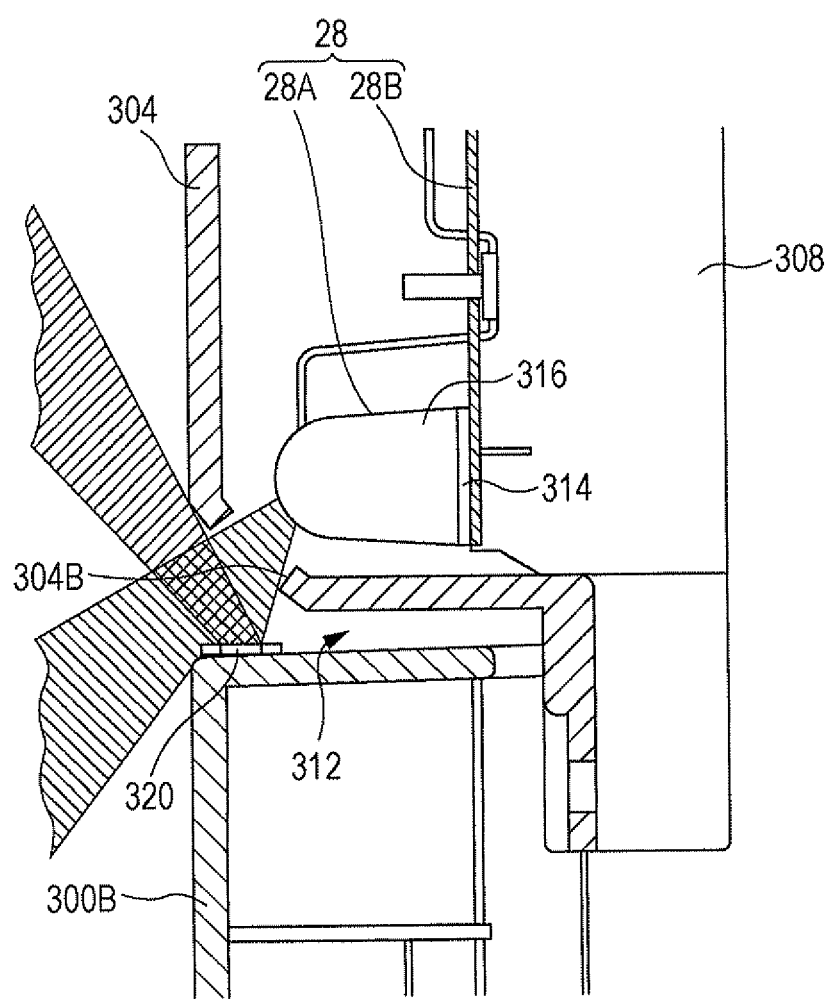
FIG. 11 is a side sectional view, corresponding to FIG. 5, for a case where a reflection mirror enables the same detection elements to perform detection in both an upper area and a lower area in accordance with a modification.

Accordingly, in a modification, as illustrated in FIG. 11, a reflection mirror (optical member) 320 is disposed on the upper surface of the lower casing 300B that faces the covering member 304. In this way, the same detection elements (detection elements 314A, 314B, 314C, and 314D in FIG. 11) are configured to perform detection in both the upper area 58A and the lower area 56A.

Specifically, regarding the lower area 56A, the light axis passes directly through the through hole 304B. On the other hand, regarding the upper area 58A, the light axis is reflected by the reflection mirror 320 to be deflected.

Here, the state "being deflected" includes the case where the light axis is refracted by a lens, prism, or the like as well as the case where the light axis is reflected by the reflection mirror 320 but is different from the state "being polarized" in which the light axis is rotated around an axis.

According to this modification, the covering member 304 has, as an opening, only the through hole 304B formed in the chamfered part 304A (the through hole 304C is no longer needed). Thus, processing that affects the design of the pillar part 302 in the elevational view is no longer needed.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A power supply control device comprising:
a moving object detecting unit that is attached to a processing apparatus body and that is capable of detecting a moving object moving in the vicinity of the processing apparatus body, the moving object detecting unit having a detection range which is divided into a lower area and an upper area, the lower area being a lower detection range for detecting a part of a moving object that is substantially in contact with the floor, the upper area being an upper detection range for detecting a top part of a moving object, the processing apparatus body including a plurality of power supply targets and a controller that controls the plurality of power supply targets; and
a power supply unit that is included in the controller and is always supplied with power so as to monitor approach of a moving object by using the moving object detecting unit, and that supplies, upon the moving object detecting unit detecting a moving object, power to a power supply target among the plurality of power supply targets that are included in the processing apparatus body, the power supply target including a part of the controller other than the power supply unit,
wherein a maximum distance from the processing apparatus body to a moving object that is facing the processing apparatus in a case where a portion of the moving object is detected with the lower area is set to be longer than a maximum distance from the processing apparatus body to the moving object that is facing the processing apparatus in case where a portion of the moving object is detected with the upper area.

2. The power supply control device according to claim 1, wherein the moving object detecting unit detects, with the lower detection range, a moving object that is moving towards the processing apparatus body at a position which is relatively far from the processing apparatus body, and
wherein the moving object detecting unit detects, with the upper detection range, a moving object that is facing the processing apparatus body at a position which is relatively close to the processing apparatus body and that is operating an operation unit.

3. The power supply control device according to claim 1, wherein the moving object detecting unit includes a plurality of detection elements having individual detection areas, and combines detection signals obtained by the plurality of detection elements into a single detection signal, and wherein the plurality of detection elements face a covering part, and the covering part has different detection openings for the upper detection area and the lower detection area.

4. The power supply control device according to claim 2, wherein the moving object detecting unit includes a plurality of detection elements having individual detection areas, and combines detection signals obtained by the plurality of detection elements into a single detection signal, and
wherein the plurality of detection elements face a covering part, and the covering part has different detection openings for the upper detection area and the lower detection area.

5. The power supply control device according to claim 1, wherein the moving object detecting unit includes a plurality of detection elements having individual detection areas, and combines detection signals obtained by the plurality of detection elements into a single detection signal, and
wherein the plurality of detection elements face a covering part, the covering part has a detection opening for one of the upper detection range and the lower detection range, and optical axes of one or more detection elements, among the plurality of detection elements, are deflected toward the other of the upper detection range and the lower detection range by a reflection mirror.

6. The power supply control device according to claim 2, wherein the moving object detecting unit includes a plurality of detection elements having individual detection areas, and combines detection signals obtained by the plurality of detection elements into a single detection signal, and
wherein the plurality of detection elements face a covering part, the covering part has a detection opening for one of the upper detection range and the lower detection range, and optical axes of one or more detection elements, among the plurality of detection elements, are deflected toward the other of the upper detection range and the lower detection range by a reflection mirror.

7. An image processing apparatus, comprising:
the power supply control device according to claim 1, the processing apparatus body including at least one processing section from among an image reading processing section that reads an image from an original document, an image forming processing section that forms an image on a recording sheet on the basis of image information, and a facsimile communication processing section that sends and receives an image in accordance with a predetermined communication procedure; and
a partial power-saving unit that is controlled by the controller so as to cause the at least one processing section to individually enter a power-being-supplied state and a power-supply-stopped state and that saves power on a processing-section-by-processing-section basis.

8. A power supply control method comprising:
detecting a moving object moving in the vicinity of a processing apparatus body, by using a detection range which is divided into a lower area and an upper area, the lower area being a lower detection range for detecting a part of a moving object that is substantially in contact with the floor, the upper area being an upper detection range for detecting a top part of a moving object, the processing apparatus body including a plurality of power supply targets and a controller that controls the plurality of power supply targets;
supplying power to a part of the controller at all times, the part monitoring approach of a moving object in the detecting; and
supplying, upon a moving object being detected in the detecting, power to a power supply target among the plurality of power supply targets that are included in the processing apparatus body, the power supply target including another part of the controller,
wherein a maximum distance from the processing apparatus body to a moving object that is facing a processing apparatus in a case where a portion of the moving object is detected with the lower area is set to be longer than a maximum distance from the processing apparatus body to the moving object that is facing the processing apparatus in a case where a portion of the moving object is detected with the upper area.

9. The power supply control device according to claim 1, wherein the moving object detecting unit is configured to detect a person approaching to the processing apparatus by detecting a movement of feet part of the person with the lower area, and to detect the person, when facing the processing apparatus, by detecting a movement of a head part of the person with the upper area.

* * * * *